(12) United States Patent
Inoue

(10) Patent No.: US 6,797,024 B2
(45) Date of Patent: Sep. 28, 2004

(54) AIR FILTER FOR ENGINE

(75) Inventor: Toshiyuki Inoue, Shizuoka (JP)

(73) Assignee: Yamato Giken Kabushiki Kaisha, Shizuoka (JP)

( * ) Notice: Subject to any disclaimer, the term of this patent is extended or adjusted under 35 U.S.C. 154(b) by 0 days.

(21) Appl. No.: 10/228,575

(22) Filed: Aug. 27, 2002

(65) Prior Publication Data

US 2003/0115842 A1 Jun. 26, 2003

(30) Foreign Application Priority Data

Dec. 25, 2001 (JP) ........................................ 2001-390907

(51) Int. Cl.[7] .............................................. B01D 50/00
(52) U.S. Cl. .......................... 55/319; 55/332; 55/385.3
(58) Field of Search ......................... 55/319, 320, 332, 55/385.3, DIG. 14

(56) References Cited

U.S. PATENT DOCUMENTS 2,540,695 A * 2/1951 Smith et al. .................. 55/332

FOREIGN PATENT DOCUMENTS

| JP | 08254162 | 10/1996 |
|---|---|---|
| JP | 2001132562 | 5/2001 |

* cited by examiner

Primary Examiner—Robert A. Hopkins
(74) Attorney, Agent, or Firm—Boyle Fredrickson Newholm Stein & Gratz S.C.

(57) ABSTRACT

An air filter for an engine has an air suction box, and a filter element for dividing the air suction box into an upstream side of an air current and a downstream side of the air current, the upstream side of the suction box being communicated with atmosphere through a suction cylinder of relatively large diameter and an air exhaust cylinder of relatively small diameter, both cylinders being arranged coaxially with each other through a small air space. The air suction box is composed of one half portion and the other half portion connected to each other through the filter element, the air suction cylinder is provided in the one half portion, and the air exhaust cylinder is provided in the other half portion.

4 Claims, 2 Drawing Sheets

AIR FILTER FOR ENGINE

BACKGROUND OF THE INVENTION

1. Field of the Invention

This invention relates to an air filter for an engine and, more particularly, relates to an air filter for a small engine suitable for use in an automobile or a motor-bicycle.

2. Description of the Prior Art

A conventional air filter for an engine has an air suction box provided in an air suction passage for communicating an inside of a combustion chamber of the engine with atmosphere. The air suction box is divided by a filter element into an upstream side and a downstream side in an air current direction. Accordingly, an entire air to be suctioned into the combustion chamber is passed through the air suction box. The air suctioned into the air suction box is included with relatively large foreign matters such as soot and sand dust, and fine foreign maters such as floating powder dust. It is difficult to remove such dust effectively by a so-called air filter using sponges or paper filters. Specifically, if the mesh of the filter is set small in order to remove effectively the fine dust, the filter is choked easily and if the mesh of the filter is set large, the fine dust cannot be removed.

In order to remove a relatively large dust, it has been proposed to use two kinds of filters and arranged in series in the air suction passage. One kind of the filter is the above mentioned filtration type filter. The other kind of filter is a wet type filter such as an oil pass type filter or an enertia type filter such as a cyclone.

However, if two or more kinds of filters are provided in the air suction passage, a large space is required and such filters cannot be used for the small automobile or the motor-bicycle having no large space for installing the engine.

SUMMARY OF THE INVENTION

An object of the present invention is to solve the above problems.

Another object of the present invention is to provide an air filter for an engine comprising an air suction box, and a filter element for dividing the air suction box into an upstream side of an air current and a downstream side of the air current, the upstream side of the suction box being communicated with atmosphere through a suction cylinder of relatively large diameter and an air exhaust cylinder of relatively small diameter, both cylinders being arranged coaxially with each other through a small air space.

Further object of the present invention is to provide the air filter for the engine, wherein the air suction box is made of a synthetic resin and composed of one half portion and the other half portion connected to each other through the filter element, the air suction cylinder is provided in the one half portion, and the air exhaust cylinder is provided in the other half portion, the insides of the both half portions being defined by the filter element.

Still further object of the present invention is to provide the air filter for the engine, wherein the air suction cylinder is in a form of funnel having a large diameter at the atmosphere side thereof and a small diameter at the air exhaust side thereof, and the air exhaust cylinder is in a form of funnel having a large diameter at the air suction side thereof and a small diameter at the atmosphere side thereof.

These and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

DESCRIPTION OF THE PREFERRED EMBODIMENTS

Figure 1:
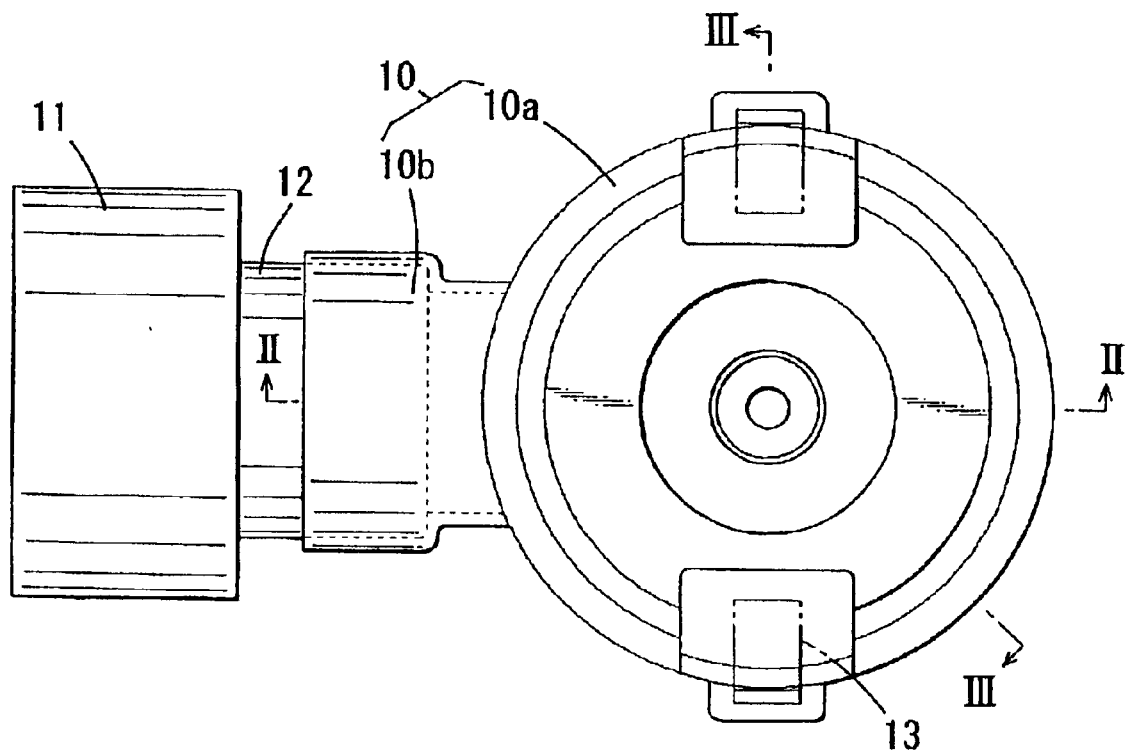
FIG. 1 is a plan view of an air filter according to the present invention.

In FIG. 1, reference numeral 10 denotes an air suction box formed by injection mold of synthetic resin.

The air suction box 10 has a cylindrical container portion 10a of large diameter and a branched tubular portion 10b projected laterally from the container portion 10a and connected to an engine 11. The container portion 10a and the branched tubular portion 10b form a part of an air suction passage 12 for introducing an atmospheric air into the engine 11.

Figure 2:
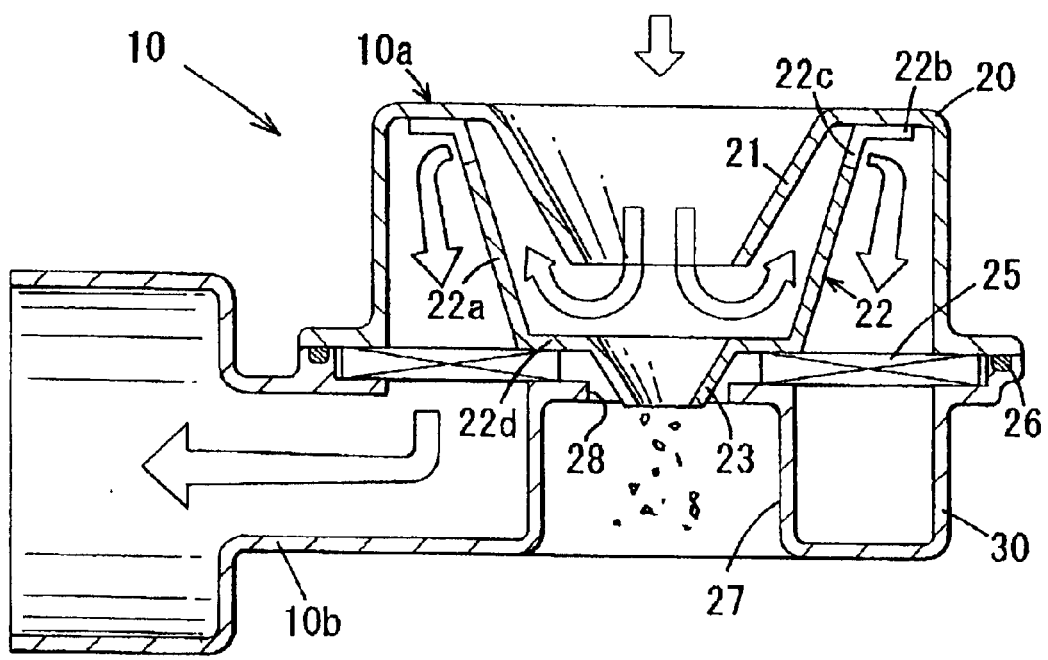
FIG. 2 is a cross-sectional view taken on the line II—II of FIG. 1.
Figure 3:
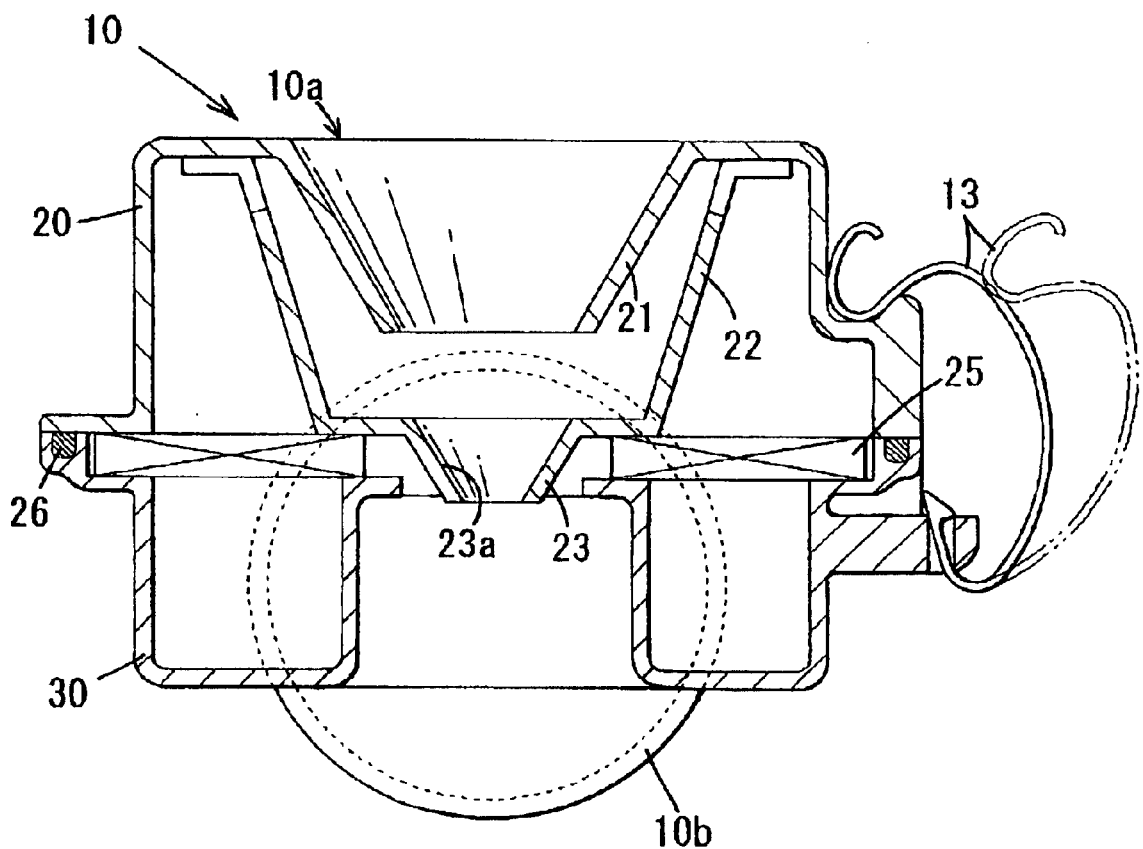
FIG. 3 is a cross-sectional view taken on the line III—III of FIG. 1.

As shown in FIG. 2 and FIG. 3, the container portion 10a has a cylindrical upper half portion 20, a cylindrical lower half portion 30, and a spring connector 13 for connecting the upper and lower half portions 20 and 30, detachably. Specifically, the half portions 20 and 30 can be separated from each other by shifting the spring connector 13 from a position indicated by a solid line to a position indicated by a phantom line as shown in FIG. 3. Accordingly, a filter element 25 and a packing 26 can be inserted between the upper and lower half portions 20 and 30 and removed for replacement therefrom.

The cylindrical upper half portion 20 has a top wall and a bottom opening. A lower edge portion of the cylindrical upper half portion 20 is connected to an upper edge portion of the cylindrical lower half portion 30. At the center portion of the top wall of the cylindrical upper half portion 20, a funnel-shaped air suction cylinder 21 is provided in order to introduce an atmospheric air into the air suction box 10. The funnel-shaped air suction cylinder 21 can be formed by bending downwards the center portion of the top wall of the cylindrical upper half portion 20 so as to form an upper opening of large diameter and a lower opening of small diameter.

The funnel-shaped air suction cylinder 21 is surrounded by a funnel-shaped air exhaust cylinder 22 secured to the top wall of the cylindrical upper half portion 20 at an upper end portion 22b of the air exhaust cylinder 22 for positioning. The air exhaust cylinder 22 comprises a tapered upper cylindrical wall 22a having a plurality of through holes 22c at the upper end portion 22b thereof, a bottom wall 22d and a tapered lower cylindrical wall 23 forming a funnel-shaped exhaust cylinder. The tapered lower cylindrical wall or exhaust cylinder 23 has an upper opening of large diameter, a lower opening of small diameter and a wall 23a. The exhaust cylinder 23 is provided at the center of the bottom wall 22d coaxially with the funnel-shaped air suction cylinder 21. The upper opening of the exhaust cylinder 23 is substantially equal in diameter to the lower opening of the suction cylinder 21. The inclined angle of the wall 23a of the exhaust cylinder 23 is set substantially equal to that of the wall of the air suction cylinder 21. As stated above, the exhaust cylinder 23 is smaller in diameter than the suction cylinder 21, so that the atmospheric air passing through the exhaust cylinder 23 is small in quantity.

The lower half portion 30 of the air suction box 10 is in the form of a vessel with top opened and has the branched tubular portion 10b at the side surface thereof and an upper edge to be connected to a lower edge of the upper half portion 20 of the air suction box 10. On the top surface of the lower half portion 30, an annular concave portion is provided coaxially with the exhaust cylinder 23 for receiving therein the filter element 25 consisting of a sponge (foam synthetic resin having open cells). On a top of an outer wall of the lower half portion 30, a groove for receiving therein the packing 26 is provided. At the center of the bottom surface of the lower half portion 30, a cylindrical concave portion 27 is provided. At the center of the cylindrical concave portion 27, a dust exhaust opening 28 is formed, so that the lower opening of small diameter of the exhaust cylinder 23 is communicated with the atmosphere through the dust exhaust opening 28. The air exhaust cylinder 22 is arranged between the cylindrical concave portion 27 and the upper half portion 20.

As stated above, when the upper and lower half portions 20 and 30 are superposed and connected to each other by the spring connectors 13, the filter element 25 and the packing 26 are held therebetween. As a result, the air suction passage 12 is formed in the air suction box 10 through the upper and lower half portions 20 and 30, and the filter element 25 is inserted into the air suction passage 12.

When the engine is started and a negative pressure is applied into the air suction box 10 through the air suction passage 12, an air current is directed from the upper opening of large diameter to the lower opening of small diameter of the air suction cylinder 21, accelerated therethrough, and discharged at a high speed into the air suction box 10. The air exhaust cylinder 23 arranged in the downstream side of the air current is smaller in diameter than the air suction cylinder 21 arranged in the upstream side of the air current, so that a large quantity of air discharged form the air suction cylinder 21 cannot be moved straight, and is turned laterally, elevated along the inner surface of the air exhaust cylinder 22, passed through the through hole 22c and reaches the filter element 25. A fine and light dust, such as a flouting powder dust included in the air current is removed by the filter element 25.

A heavy dust in the discharged air current has a large inertia, so that it is separated from the air current, moved straight, entered into the air exhaust cylinder 23, guided by the inclined surface of the air exhaust cylinder 23, and discharged from the air suction box 10 to the outside. Thus, it is not necessary to remove the heavy dust included in the air current by the filter element 25, so that the service life of the filter element 25 can be prolonged without choking by the heavy dust.

Figure 4:
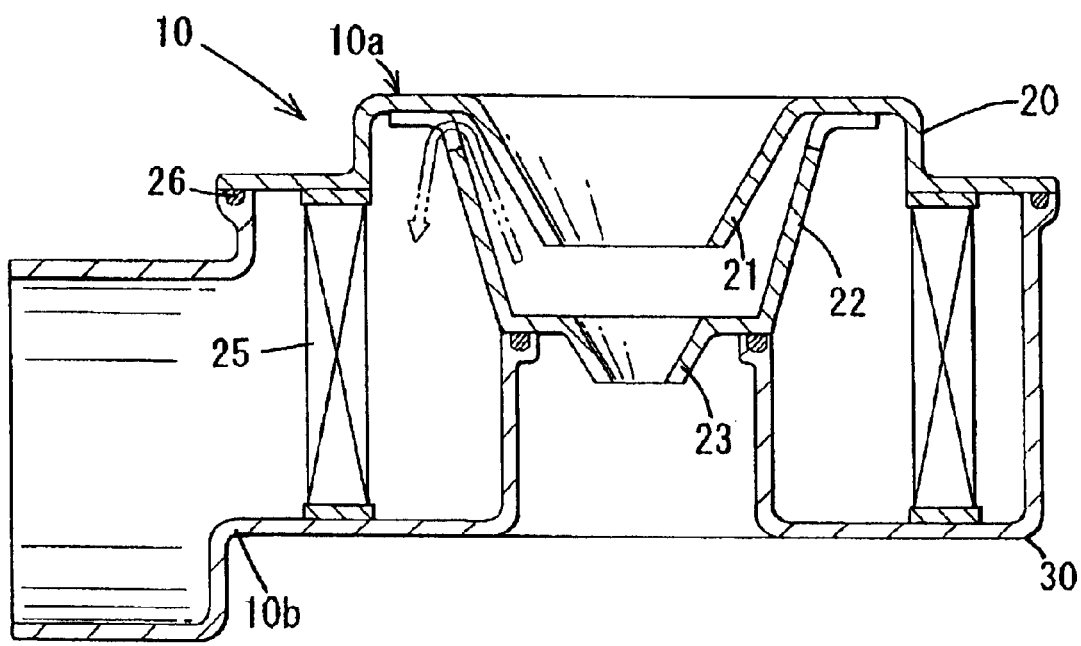
FIG. 4 is a cross-sectional view of an air filter according to the other embodiment of the present invention.

FIG. 4 shows the other embodiment of an air filter for an engine according to the present invention.

In this embodiment, a filter element 25 consisting of paper is used instead of the filter element 25 consisting of the sponge. This embodiment is similar to the first embodiment, so that constructional parts similar to those of the first embodiment shown in FIG. 1 to FIG. 3 are indicated at like reference characters, and the detailed explanation thereof is omitted.

Having such configurations as stated above, the air filter for the engine according to the present invention has excellent effects as follows.

According to the invention of claim 1, the heavy dust is removed by utilizing the inertia of the dust, and the fine dust is removed by the filter element, so that the filter element is prevented from being choked by the heavy dust. The device for removing the heavy dust utilizing the inertia of the dust can be formed simply by the air suction cylinder and the air exhaust cylinder supported by the air suction box, so that the air filter including the filter element can be made small.

According to the invention of claim 2, the air suction cylinder and the air exhaust cylinder for forming the device for removing the heavy dust utilizing the inertia of the dust is arranged in the half portion of the air suction box, so that the air filter can be manufactured easily with low cost.

According to the invention of claim 3, each of the air suction cylinder and the air exhaust cylinder for forming the device for removing the heavy dust utilizing the inertia of the dust is in the form of a funnel, so that a high separation ability of the dust can be obtained by the simple construction.

While the invention has been particularly shown and described with reference to the preferred embodiments thereof, it will be understood by those skilled in the art that various changes in form and details may be made therein without departing from the spirit and scope of the invention as defined by the appended claims.

What is claimed is:

1. An air filter for an engine comprising:
    an air suction box, and a filter element for dividing the air suction box into an upstream side of an air current and a downstream side of the air current, the upstream side of the suction box being communicated with the atmosphere through an air suction cylinder and an air exhaust cylinder, both cylinders being arranged coaxially with each other through a small air space, the air suction cylinder being in a form of a funnel having a diameter that continuously decreases from an air suction side thereof to an air exhaust side thereof, and the air exhaust cylinder being in a form of a funnel having a diameter that continuously decreases from an air suction side thereof to an atmosphere side thereof.

2. An air filter for an engine, the air filter comprising:
    an air suction box, and
    a filter element that divides the air suction box into an upstream side thereof and a downstream side thereof,
    wherein the upstream side of the suction box communicates with the atmosphere through an air suction cylinder and an air exhaust cylinder,
    wherein both cylinders are arranged coaxially with each other,
    wherein the air suction cylinder is in a form of a funnel having a diameter that continuously decreases from an air suction side thereof to an air exhaust side thereof, and
    wherein the air exhaust cylinder is in a form of a funnel having a diameter that continuously decreases from an air suction side thereof to an atmosphere side thereof.

3. The air filter as claimed in claim 2, wherein the air suction box is made of a synthetic resin.

4. An air filter for an engine, the air filter comprising:

an air suction box, and a filter element that divides the air suction box into an upstream side thereof and a downstream side thereof, wherein the upstream side of the suction box communicates with the atmosphere through an air suction cylinder and an air exhaust cylinder, wherein both cylinders are arranged coaxially with each other, wherein the air suction cylinder is in a form of a funnel having a relatively large diameter at an air suction side thereof and a relatively small diameter at an air exhaust side thereof, and wherein the air exhaust cylinder is in a form of a funnel having a relatively large diameter at an air suction side thereof and a relatively small diameter at an atmosphere side thereof, wherein the air suction box is composed of a first half portion and a second half portion that are connected to each other through the filter element, wherein the air suction cylinder is provided in the first half portion, and the air exhaust cylinder is provided in the second half portion, and wherein insides of the both half portions are defined by the filter element.

* * * * *